Dec. 22, 1936.  J. L. NILSON  2,065,089
PIVOT ARM CONSTRUCTION FOR WRINGER MOPS
Filed March 23, 1936
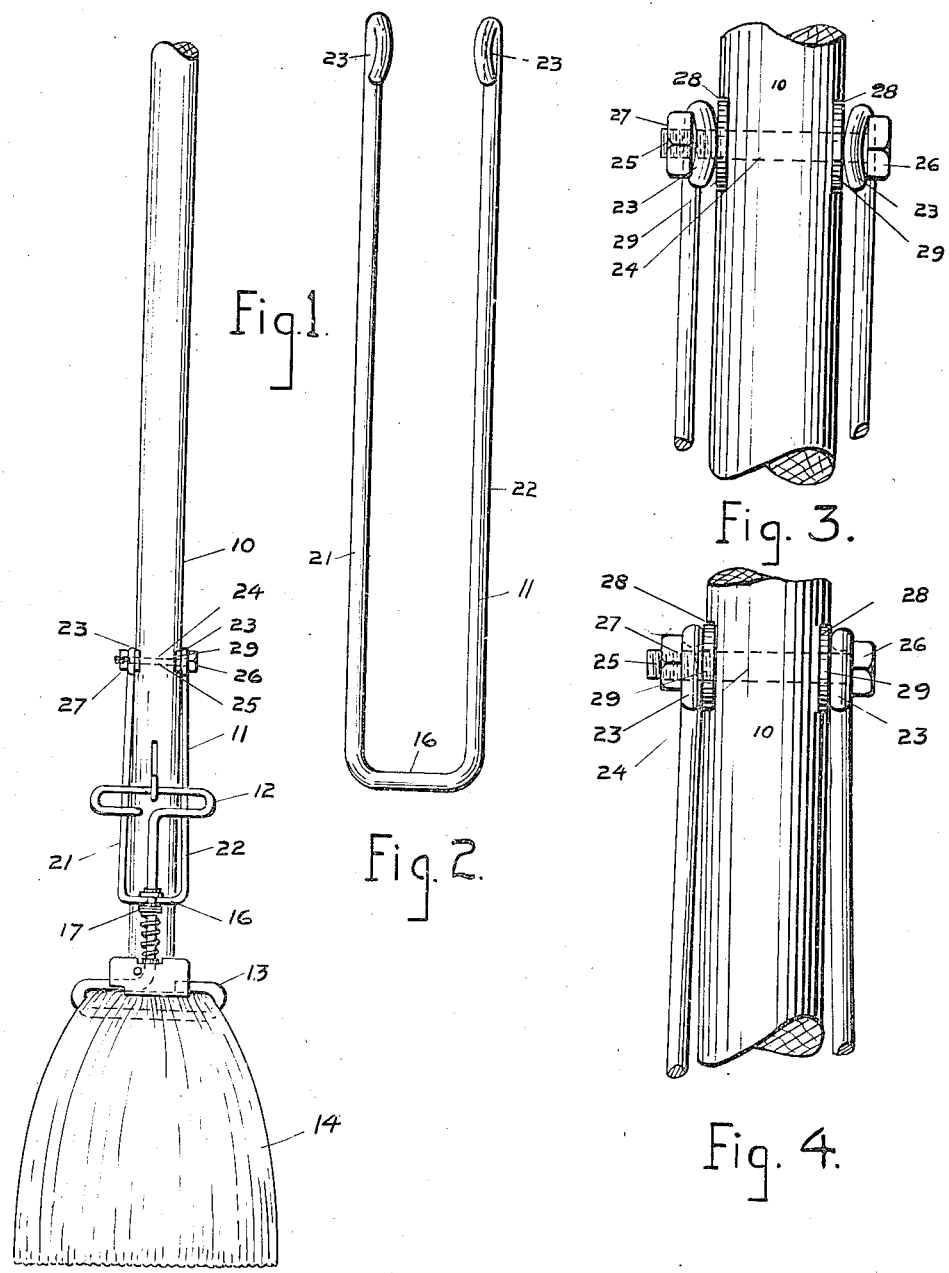
INVENTOR.
John L. Nilson
BY
James R. McKnight
ATTORNEY.

Patented Dec. 22, 1936

2,065,089

UNITED STATES PATENT OFFICE 2,065,089

PIVOT ARM CONSTRUCTION FOR WRINGER MOPS

John L. Nilson, Chicago, Ill.

Application March 23, 1936, Serial No. 70,353

2 Claims. (Cl. 15—120)

My invention relates to the twist wringing type of mop.

Among the objects of my invention are the following: To create a wringer mop having a frictionally pivoted pivot arm; to provide a pivot arm so constructed that it will itself operate without the necessity of auxiliary devices to hold the wringing mechanism in a desired position during the wringing operation; to supply a pivot arm frictionally pivoted to the handle so as to overcome gravity that pulls the wringing mechanism down upon the handle out of wringing position upon the operator releasing the wringing mechanism by taking a new grip thereon; and such other objects, advantages and capabilities as will later more fully appear and which are inherently possessed by my invention.

While I have shown in the accompanying drawing a preferred embodiment of my invention yet I wish it understood that the same is susceptible of modification and change without departing from the spirit of my invention.

Referring more particularly to the drawing, Fig. 1 is a front elevation of my wringer mop; Fig. 2 is a detailed view of a preferred embodiment of my pivot arm structure; Fig. 3 is a detailed view showing my pivot arm in assembled position before pressure is applied to the loops and Fig. 4 shows the same after pressure has been applied to the loops so that they are at a right angle to the pivot bolt.

My wringer mop comprises an elongated handle 10, a pivot arm structure 11, a wringing mechanism 12, a swab holder 13 connected to the bottom of the handle 10, and a swab 14 extending between the swab holder 13 and the wringing mechanism 12.

Referring more particularly to my pivot arm 11, it comprises a pair of substantially parallel side portions 21 and 22. A bottom portion 16 is formed at right angles to and connects said side portions 21 and 22, and acts as a bearing for the U-shaped member 17. Each of said side portions 21 and 22 ends in a loop or eye 23. A passage way or hole 24 cut or otherwise formed through said handle 10 at a right angle thereto is adapted to receive a pivot pin or bolt 25 having a head 26. My side portions 21 and 22 are placed opposite the openings of said hole 24 and the bolt is passed through the hole 24 and said loops 23. The loops are so constructed that as they receive the bolt they are not at a right angle to said bolt. A nut 27 is screwed to the other end of the bolt 25 until the pressure forces the surfaces of the loops 23 to become at a right angle to the pivot bolt 25. The initial torque or torsion in the two parallel side portions of the pivot arm now because of the pressure on the loops forms a tension which results in a friction for holding the pivot arm in any desired position fixed by the operator.

In use, my pivot arm pivots on the pivot bolt at the discretion of the operator. When the operator gets the wringing mechanism in a desired position for wringing, the friction holds the pivot arm in that position and acts to prevent gravity from pulling the pivot arm and the wringing mechanism down on the handle whenever the operator loosens his grip on the wringing mechanism. With my frictionally pivoted pivot arm the user may remove his hands from the wringing mechanism as many times as desired during the wringing operation and the pivot arm holds the wringing mechanism in the same position for each succeeding grip by the user.

I may provide my handle 10 with recesses 28 on either side of said hole 25 to receive a washer 29.

The form of my loops and their construction shown in the drawing are merely illustrative of my invention which is a pivot arm frictionally pivoted to a handle of a wringer mop, wherein the pivot arm itself acts as a tension member without the need of auxiliary structure or devices.

As my handle may expand or contract or otherwise change in size, my pivot arm structure will automatically and continuously compensate for these differences and will continue to permanently have tension sufficient to create the necessary friction for the proper operation of my structure without the necessity of tightening the nut or other pressure exerting means.

My Patent No. 2,018,413 of October 22, 1935, shows and claims a torque arm construction, a wringing mechanism, a ratchet and a selector. My Patent No. 2,043,973 claims a torque arm construction in which the retaining rod is slidable with respect to the handle. My Patent No. 2,043,975, relates to a combination wringing mechanism and swab holder lock for wringer mops. My Patent No. 2,043,974, relates to a torque arm structure in which the retaining rod is slidable on the torque arm and adapted to lock by gravity in an offset in the torque arm. My Patent No. 2,045,958 claims a pivot arm lock, particularly useful with wringer mops.

My present invention herein is new and different from the above patents in that in this case I disclose a frictionally pivoted torque arm for holding the wringing mechanism in a desired position during the wringing operation not shown, described, or claimed in my previous patents and applications.

As previously stated in my Patents Nos. 2,043,973 and 2,043,975, the wringing mechanism 12 also shown herein has a U-shaped member 17 which is supported on the bottom portion 16 of my torque arm 11. The U-shaped member 17 acts as a bearing for the twisting shaft 24 which passes transversely through both legs of the U-shaped member 17 so as to prevent vertical displacement of the U-shaped member. Said twisting shaft when operated will, of course, twist the swab to remove liquid therefrom.

Having thus described my invention, I claim:

1. A pivot arm construction for wringer mops comprising an elongated handle having a transverse passage extending therethrough, a pivot arm, said pivot arm having a pair of substantially parallel side portions joined by a bottom portion, each of said side portions ending in a substantially loop shaped portion, a pivot pin passing through the passage in said handle and through said loops, said loops formed so that they are not at a right angle to said inserted pivot pin, and means for exerting pressure on said loops until they are positioned at a right angle to said inserted pivot pin to thereby frictionally pivot said pivot arm to said handle, so that as said pivot arm is swung toward and away from said handle said pivot arm will stay in any desired position with respect to said handle to which it is moved by the operator.

2. A pivot arm construction for wringer mops, comprising an elongated handle, a pivot arm, said pivot arm having a pair of substantially parallel side portions joined by a bottom portion, each of said side portions ending in a substantially loop shaped portion, said loops being pivotally mounted on said handle, said loops being formed so that they are not at a right angle to said pivot means, and means for exerting pressure on said loops until they are positioned at a right angle to said pivot means, to thereby frictionally pivot said pivot arm to said handle, so that as said pivot arm is swung toward and away from said handle said pivot arm will stay in any desired position with respect to said handle to which it is moved by the operator.

JOHN L. NILSON.